United States Patent [19]

Chance

[11] B 3,914,106

[45] Oct. 21, 1975

[54] PROCESS FOR TREATING ORGANIC TEXTILES WITH FLAME RETARDANT POLYMERS MADE FROM HYDROXYMETHYLPHOSPHORUS COMPOUNDS AND GUANAZOLES

[75] Inventor: Leon H. Chance, New Orleans, La.

[73] Assignee: The United States of America as represented by the Secretary of Agriculture, Washington, D.C.

[22] Filed: Jan. 31, 1973

[21] Appl. No.: 328,205

[44] Published under the Trial Voluntary Protest Program on January 28, 1975 as document no. B 328,205.

Related U.S. Application Data

[62] Division of Ser. No. 215,409, Jan. 4, 1972, abandoned.

[52] U.S. Cl. .................. 8/116 P; 252/8.1; 117/136
[51] Int. Cl.² ......................................... D06M 1/00
[58] Field of Search ........ 8/116 P; 252/8.1; 117/136

[56] References Cited

UNITED STATES PATENTS

| | | | |
|---|---|---|---|
| 2,668,096 | 2/1954 | Reeves et al. | 8/116 P |
| 2,809,941 | 10/1957 | Reeves et al. | 8/116 P |
| 2,814,573 | 11/1957 | Reeves et al. | 8/116 P |
| 2,993,746 | 7/1961 | Miles et al. | 8/116 P |
| 3,054,698 | 9/1962 | Wagner | 8/116 P |
| 3,698,854 | 10/1972 | Donaldson et al. | 8/116 P |

*Primary Examiner*—Stephen J. Lechert, Jr.
*Attorney, Agent, or Firm*—M. Howard Silverstein; Max D. Hensely

[57] ABSTRACT

Flame retardant cotton fabrics, very durable to repeated laundering, were prepared by treatment with aqueous solutions of tetrakis(hydroxymethyl)phosphonium chloride (THPC), tetrakis(hydroxymethyl)phosphonium hydroxide (THPOH), or tris(hydroxymethyl)phosphine (THP) and guanazole. Flame retardant thermosetting resins were also prepared from the reaction of guanazole with THPC, THPOH, or THP.

2 Claims, No Drawings

PROCESS FOR TREATING ORGANIC TEXTILES WITH FLAME RETARDANT POLYMERS MADE FROM HYDROXYMETHYLPHOSPHORUS COMPOUNDS AND GUANAZOLES

A nonexclusive, irrevocable, royalty-free license in the invention herein described, throughout the world for all purposes of the U.S. Government, with the power to grant sublicenses for such purposes, is hereby granted to the Government of the United States of America.

This is a division of application Ser. No. 125,409, filed Jan. 4, 1972 now abandoned.

This invention is an improvement in or modification of the inventions claimed in U.S. Pat. Nos. 2,772,188, 2,809,941, 2,983,623, 3,247,015, 3,247,016, 3,276,897, and U.S. patent application Ser. No. 767,584, filed Oct. 4, 1968. In general, this invention relates to the formation of flame retardant polymers which contain phosphorus and nitrogen and to the treatment of cellulosic materials with a water soluble further polymerizable precondensate which contains phosphorus and nitrogen, and which reacts with the cellulosic material in addition to being polymerized within the cellulosic material with heat, thereby producing flame-retardant cellulosic materials.

In particular, this invention relates to the formation of flame retardant polymers prepared by the reaction of tetrakis(hydroxymethyl)phosphonium salts, tetrakis(hydroxymethyl)phosphonium hydroxide, tris(hydroxymethyl)phosphine oxide or tris(hydroxymethyl)phosphine with aminotriazoles, commonly referred to as guanazoles. This invention also relates to processes for making cellulosic materials flame-retardant by treatment with water soluble precondensates of the above-mentioned hydroxymethylphosphorus compounds and aminotriazoles, hereinafter referred to as guanazoles.

Guanazoles suitable for use in this invention have the following structure:

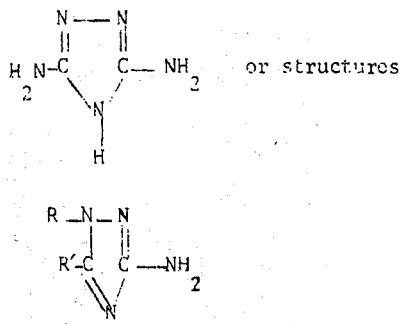

wherein R may be H, $NH_2$, or an alkyl or aryl radical [Ref., D. W. Kaiser, et al., J. Org. Chem. 18, 1610–15 (1953)], and R may be H or $NH_2$.

The guanazoles can be suitably prepared from hydrazines or hydrazine salts and cyanoguanidine (also known as dicyandiamide). A particularly suitable method appears in U.S. Pat. No. 2,648,671, and involves the reaction of hydrazine hydrochloride and cyanoguanidine.

In the U.S. patents cited above, a variety of methods are claimed for the preparation of precondensates of hydroxymethylphosphorus compounds and various nitrogen compounds. The latter compounds include melamine, methylol-melamine, and amides such as: urea, thiourea, polypeptides, ethyl carbamate, tris(carbamoylethyl)amine, dicyandiamide, and guanidine, as well as amines such as: ammonia, polyamines, primary, or secondary aliphatic, alicyclic, or aromatic amines, and cyclic imines such as ethylenimine or polyethylenimine.

Whereas most of the flame retardants referred to in the patents cited above are satisfactory for various uses, it is an object of this invention to provide new polymers and a process for their application to cellulosic materials, which have certain advantages over those previously cited. These advantages will become apparent in the disclosures to follow.

Another object of this invention is to provide flame-retardant cellulosic materials which are stable to repeated laundering and which retain essentially all of their strength and abrasion resistance without adversely affecting the hand or color of the material.

Still another object of this invention is to provide cellulosic materials which have improved wrinkle recovery as well as flame retardancy.

A further object of this invention is to provide a process for treating cellulosic materials with flame retardants in which there is no appreciable release of formaldehyde during processing.

These and other objects of this invention will become apparent to those skilled in the art of making flame-retardant cellulosic materials.

A flame retardant which has received some acceptance commercially and which is claimed in numerous patents is based on THPC and trimethylolmelamine. Some disadvantages have been associated with this process. Amont these disadvantages are stiffness imparted to cotton fabrics, particularly lightweight cotton fabrics, excessive strength loss and release of formaldehyde during textile processing. The released formaldehyde in addition to being objectionable to the operators of the processing equipment, also presents a potential health hazard. In this invention, the use of guanazoles instead of trimethylolmelamine have several advantages. In the first place trimethylolmelamine contains free formaldehyde and also releases formaldehyde during textile processing, whereas guanazoles contain no formaldehyde. Guanazoles react very rapidly with formaldehyde and, thereby, serve as scavengers of formaldehyde released from the THPC, THPOH, or THP during textile processing. The guanazoles, therefore, serve a unique dual purpose. They scavenge formaldehyde and at the same time condense with the hydroxymethylphosphorus compounds to form flame-retardant polymers. Another advantage in using guanazoles is that an excellent hand can be obtained on lightweight cotton textiles. Still another advantage of using guanazoles over trimethylolmelamine is that strength and abrasion losses of treated cotton textiles are not as great.

Another flame retardant which has received some commercial acceptance is based on THPC and ammonia. Here, again, there is the disadvantage of formaldehyde odors during textile processing as well as the odor of ammonia. When guanazoles are used, the formaldehyde odor is (to a large extent) eliminated, and, furthermore, ammonia is not needed.

Phosphorus compounds particularly suitable for use in this invention are tetrakis(hydroxymethyl)phosphonium chloride, tetrakis(hydroxymethyl)phosphonium hydroxide, and tris(hydroxymethyl)phosphine, hereinafter referred to as THPC, THPOH, and THP, respectively. The nitrogen compound particularly suitable for use in this invention is 3,5-diamino-1,2,4-triazole, commonly known as guanazole. This compound will hereinafter be referred to as guanazole.

Hydroxymethyl phosphorus polymeric materials containing nitrogen are produced by reacting at least one compound of the group consisting of THPC, THPOH, or THP with guanazole. In the preparation of these polymeric materials other nitrogen compounds may be used in conjunction with guanazole. The compounds include amides from the group consisting of urea, thiourea, cyclic ureas, carbamates, cyanamide, and methylolmelamines.

In accordance with this invention, any cellulosic material such as cotton, rayon, jute, linen, ramie, paper, and the like, may be treated. Other materials such as blends of cotton and polyester and wool may be treated, but the invention particularly effective when applied to the treatment of cellulosic textiles.

Although THPC may be used with guanazole to produce flame retardant cellulosic materials, THPOH and THP are preferred because of the greater stability of the solutions used to treat the cellulosic materials. The THP used in this invention was a relatively pure crystalline compound containing very little formaldehyde. The THPOH was prepared by neutralization of aqueous solutions of THPC with a base such as sodium hydroxide. The term THPOH is used merely for convenience since the solution contains a considerable amount of THP as well as other hydroxymethylphosphorus compounds [Ref., W. J. Vullo, J. Org. Chem. 33, 3665 (1968)]. If the pH of the solutions were 7 or above, they were considered to contain THPOH. At pH values of 8 to 9.5, solutions of THPOH evolve 1 mole of hydrogen gas for every mole of THPOH. Therefore, when preparing large quantities of THPOH it is necessary, for reasons of safety, to take precautions necessary to prevent hazards of explosions. In this respect, using pure crystalline THP has an advantage over THPOH because no hydrogen is evolved in solutions of guanazole and THP. At pH values lower than 8 it is advantageous to use less than 1 mole of guanazole per mole of the phosphorus compound because the solutions are more stable at the lower mole ratios. One advantage of operating at solution pH values below 8 when THPOH is used is that the evolution of hydrogen is considerably less.

In preparing the nitrogen and phosphorus polymers the hydroxymethylphosphorus compound and the guanazole are dissolved in water, adjusted to pH values ranging about from 2.8 to 9.5 and allowed to polymerize at temperatures ranging about from ambient room temperature (25°–28°C.) to 180°C. The polymerization proceeds more rapidly at low ph values and high temperatures. For example, a water solution containing THPC and guanazole in a 1:1 mole ratio has a pH of 2.8 and sets to a white opaque gel in about 30 minutes at 27°C., whereas at pH 9.0 more than 24 hours at 27°C. is required for a white solid polymer to separate from the water solution. The polymers form much more rapidly at higher temperatures and may be isolated by filtering or by evaporation of the water. The polymers are white thermosetting resins and are flame resistant.

In treating cellulosic materials, the material is impregnated with the aqueous solution of the hydroxymethylphosphorus compound and guanazole, preferably by padding, although other impregnating techniques may be used. It is preferable, although not necessary, to add a surface active agent and a softening agent to the pad bath in order to improve the wetting out of the cellulosic material as well as the strength and abrasion resistance of the material. Although the pH of the pad bath may range about from 2.8 to 9.5 the preferred range is 7.5 to 9.5. At pH values of 2.8 to 7.5 polymer formation in the bath is too rapid for practical application to cellulosic textiles. The optimum pH range from the standpoint of pad bath stability is 8.5 to 9.5. The mole ratio of hydroxymethylphosphorus compound to guanazole may vary about from 1:0.25 to 1:1.5. The preferred range is 1:0.75 to 1:1.25. However, if solution pH values below 8 are used it is advantageous to use the lower mole ratios of THPOH:Guanazole of 1:0.25 to 1:0.75, because the solutions are more stable at low pH values when low mole ratios are used. Since precondensation occurs in the pad bath, it is preferable to treat the textiles with freshly prepared solutions, in order to obtain textiles which have a good hand. For example, solutions at pH 9.0 should be used within 15–20 hours after preparation. However, when THPOH is used it can be prepared several days in advance before adding the guanazole. This can be accomplished by adjusting a water solution of THPC to about pH 7.5 with a base such as sodium hydroxide. Just prior to adding the guanazole the pH is adjusted with more base to 8.5 to 9.0; the guanazole is then added and the pH finally adjusted to the desired value. This is necessary because the pH drops slightly when the guanazole is added. Since the solution is less stable at lower pH values it is advantageous when padding textiles to use textiles which are neutral or slightly alkaline so that the pH of the pad bath is not appreciably lowered. Many textiles, particularly cotton textiles, are slightly acidic, due to an acid sour after kier boiling and scouring, and thus could lower the pad bath pH.

The impregnated cellulosic material may be cured without a drying step, or it may be dried prior to curing. The drying temperature can range about from room temperature to 110°C., although 80°–90°C. is preferred. The drying time may vary about from several hours at room temperature to 1 minute at 85°–110°C. The curing time may vary about from room temperature to 180° for periods of time about from 1 minute to 18 hours, the longer time being required for the lower temperatures.

Cellulosic materials treated in accordance with this invention have excellent flame-retardant properties which is retained after repeated laundering. Crosslinking of the cotton fibers was indicated because they were insoluble in cupriethylenediamine hydroxide, and because of the increase in wrinkle recovery of the treated cotton fabric. The flame retardant finish is resistant to both acid and alkaline hydrolysis. When cellulosic textiles are treated with THPOH or THP at the optimum pH range of 8.5 to 9.5, the strength retention and abrasion resistance are very good. This is an advantage over previously reported processes involving THPC or THPOH in combination with amides such as trimethylolmelamine or cyanamide, in which pH ranges from slightly acidic to about 7.5. It is well known that cellulose is degraded more at an acidic pH than at an alkaline pH. White cellulosic materials treated according to this invention are not discolored, and dyed materials show no noticeable change in shade. Cellulosic materials treated according to this invention should not be bleached with hypochlorite bleaches because the finish is sensitive to hypochlorite. However, treatment with peroxides such as hydroxen peroxide or sodium perborate does not damage the finish. In fact, peroxide treatments are known to increase sunlight stability and laundering stability of THPOH and THP type flame retardants on cellulosic textiles.

The following examples illustrate the methods of carrying out the invention but the invention is not restricted to these examples. Treated fabrics were tested by the standard methods of the American Society For Testing Materials, Philadelphia, Pa., 1964 Book of ASTM Standards. Breaking strength was determined by the one-inch strip method, ASTM designation, D1682-64; tearing strength by the Elmendorf method D1424-63; flex abrasion, D1175-64T; and wrinkle recovery, D1295-60T. Flame resistance was tested by the standard vertical method, Fed. Spec. CCC-T-191b, Method 5902. In some cases the strip angle flame resistance test was used as described by Reeves, W. A., et al., Textile Research Journal 23, 529 (1953). It is referred to as the match test angle. The laundering was carried out in an agitator-type washing machine and the fabrics were dried in a tumble drier at a maximum temperature of about 60°C. The wash water temperature was about 48°C., and the pH of the wash water containing the detergent was 8.9. Both the washing cycle and the drying cycle were for 30 minutes.

The percentages and parts are by weight.

POLYMER PREPARATION

EXAMPLE 1

4.76 Grams of an 80% water solution of tetrakis(hydroxymethyl)phosphonium chloride(THPC) (3.81 grams of THPC, 0.02 mole) and 1.98 grams (0.02 mole) of guanazole (designated Gz) were dissolved in 10 grams of water. The pH of the solution was 2.8. The solution began to show a blue opalescence in about 15 minutes at room temperature (circa 27°C.). A white polymer began to form in about 22 minutes. In about 30 minutes an opaque white gel formed. The gel was heated for 15 minutes at 85°–90°C. and then for 30 minutes at 150°C. The resulting polymer was washed with water and then with acetone, and dried. A hard brittle pale-pink flame-resistant polymer weighing 5.36 grams was obtained. It contained 19.63% N and 12.41% P.

EXAMPLE 2

4.76 Grams of 80% THPC (3.81 grams of THPC, 0.02 mole) was dissolved in 5 grams of water. The solution was adjusted to pH 9.0 with 4.4 grams of aqueous 20% sodium hydroxide. This solution contained THPOH (as defined in the disclosure). Then 1.98 grams (0.02 mole) of Gz. was added and the pH finally adjusted to 9.5 with additional sodium hydroxide. After standing at room temperature for about 30 minutes the clear solution was placed on a steam bath. The heating caused a vigorous evolution of gas. Within 3 minutes of heating, a white polymer formed almost instantaneously. Continued evolution of gas during a 30-minute heating period on the steam bath caused a foamy mass of white polymer to form. To complete the polymerization, the polymer was further heated for 30 minutes at 150°C. It was washed with water, then with acetone, and dried. The pH of the wash water was 8.8 indicating that the polymer was formed under alkaline conditions. The flame-resistant polymer weighed 3.61 grams. It contained 25.64%N and 10.50%P.

A similar polymer was obtained by allowing the solution of THPOH and Gz. to stand at room temperature for several days.

EXAMPLE 3

3.72 Grams (0.03 mole) of crystalline tris(hydroxymethyl)phosphine of 95% purity and 2.97 grams (0.03 mole) of Gz. were dissolved in 15 grams of water. The pH of the solution was 6.8. The solution was heated on a steam cone. Within 3 to 4 minutes of heating time a white polymer formed which gelled within 5 to 7 minutes. The gel solidified with further heating on the steam bath. After heating for 30 minutes on a steam bath the polymer was further heated for 30 minutes at 150°C. The white flame-resistant polymer was not brittle and could be easily ground to a powder. The powder was washed with water and then with acetone, and dried. It weighed 5.58 grams. It contained 25.47% N and 6.38% P.

A similar polymer was formed by allowing the solution to stand at room temperature for several days.

EXAMPLE 4

2.37 Grams of an 80% water solution of THPC (1.9 gms. of THPC, 0.01 mole) was dissolved in 3 grams of water and the pH adjusted to 8.4 with 2.1 grams of 20% NaOH. Then 0.3 grams (0.005 mole) of urea was added. The pH remained at 8.4. Then 0.99 grams (0.01 mole) Gz. was added. The pH dropped immediately. When the pH reached 7.3 it was adjusted to 7.67 with NaOH. After 4 hrs. of standing at room temperature (circa 27°C.) a viscous polymer formed which hardened to a flame resistant white solid polymer in several days.

Fabric Treatments

A typical procedure for the preparation of water solutions of THPOH and guanazole (designated Gz.) for textile treatments is as follows:

44.18 Grams of an 80% water solution of THPC (equivalent to 32.0 grams (0.186 mole) calculated as THPOH) was dissolved in 75.2 grams of water and 0.18 grams of an alkylaryl polyether alcohol; (in this case, Triton X–100 (Rohm and Haas)) was added as a wetting agent. Then the solution was brought to a pH of 8.5 to 9.0 by adding (with stirring) 20% aqueous sodium hydroxide. The solution is kept at about room temperature by external cooling if necessary, during the addition of NaOH. Then 18.43 grams (0.186 mole) of Gz. and 4.00 grams of 45% Velvetol OE (a polyethylene softener from Quaker Chemical Corp.) were added. The guanazole caused a drop in pH, so it was necessary to readjust to the desired pH by either adding dilute NaOH or dilute acid, such as hydrochloric acid. For this formulation, the pH was adjusted to 9.0 by adding NaOH. The total 20% NaOH required was 38.11 grams. The typical formula is as follows:

```
  44.18 g.  THPC (0.186 mole)
  18.43 g.  guanazole (0.186 mole)
   0.18 g.  Triton X-100 (wetting agent)
   4.00 g.  45% Velvetol OE (1.8 g. total solids)
  38.11 g.  20% NaOH
  75.20 g.  water
 180.10 g.  TOTAL WGT. OF SOLUTION
```

The above solution contained 17.76% THPOH and 10.24% Gz. (total reactive solids is 28%), 0.1% wetting agent, and 1.0% softener.

All of the solutions used in the following examples were prepared similarly, the only difference being in varying the pH, the concentration of THPOH and Gz., or the mole ratio of THPOH to Gz. At pH values of 8.0 or above some foaming of the solution occurs due to the evolution of gases.

In applying the solutions of THPOH and Gz. to fabrics, the solutions were allowed to age at room temperature for periods of time varying from only 10–15 minutes up to 24 hours.

EXAMPLE 5 pH Study

A set of 5 different solutions were prepared by the typical procedure described above. Each solution contained 17.76% THPOH and 10.24% Gz. (28% total solids, 1:1 mole ratio) and 0.1% Triton X–100 and 1% Velvetol OE (solids basis). Each solution was adjusted to a different pH (see Table I below). A sample of 7.6oz. white cotton sateen (kier-boiled, bleached, and scoured) was impregnated with each solution to a wet pickup of about 80–82% by using a laboratory padder. The solutions were 10–15 minutes old at the time of padding. After the padding operation, the fabric samples were dried for 4 minutes at 85°C. and cured for 3 minutes at 160°C. The fabric data are shown in Table 1. All samples passed the vertical flame test.

Table 1

| Fabric No. | Solution pH | Fabric add-on % | Vertical flame test char length, inches |
| --- | --- | --- | --- |
| 1 | 7.5 | 18.6 | 2.4 |
| 2 | 8.0 | 17.3 | 2.4 |
| 3 | 8.5 | 16.5 | 2.3 |
| 4 | 9.0 | 16.2 | 2.6 |
| 5 | 9.5 | 16.8 | 2.1 |

The stability of the THPOH-Gz. pad bath increases with pH up to pH 9.0. Unexpectedly, the solution at pH 9.5 deposited a polymer a little sooner than at pH 9.0. Therefore, pH 9.0 was selected as optimum for textile applications. For certain fabrics, e.g., 8 oz. sateen, solutions at pH 9.0 gave satisfactory results even after storage at room temperature (circa 27°C.) for 18–20 hours.

EXAMPLE 6

Mole Ratio Study

A typical solution of THPOH and Gz. was prepared containing 28% solids and having a pH 9.0. The mole ratio of THPOH to Gz. was varied from 1:0.25 to 1:1.5. The solutions were allowed to age at room temperature for 2 hours and then applied to white 8 oz. cotton sateen, as in Example 5. The data are shown in Table 2.

Table 2

| Fabric No. | Mole ratio THPOH:Gz | Fabric add-on % | Vertical Falme test char length, inches |
| --- | --- | --- | --- |
| 1 | 1:0.25 | 8.0 | BEL* |
| 2 | 1:0.50 | 16.0 | 2.4 |
| 3 | 1:0.75 | 17.4 | 2.4 |
| 4 | 1:1 | 18.8 | 2.1 |
| 5 | 1:1.25 | 19.3 | 2.1 |
| 6 | 1:1.5 | 19.7 | 2.0 |

*BEL means burned entire length of sample.

The fabric add-on increased with increased mole ratio. All samples except No. 1 passed the vertical flame test. All samples had an excellent hand.

EXAMPLE 7

Curing Temperature Study

A solution of THPOH and Gz. was prepared by the typical procedure. It contained 28% solids at a mole ratio of THPOH: Gz. of 1:1. The fabric samples (8 oz. white cotton sateen) were dried for 4 minutes at 85°C. and cured for 3 minutes at the temperatures indicated in Table 3.

Table 3

| Fabric No. | Curing temp °C | Fabric add-on % | Vertical flame test char length, inches |
| --- | --- | --- | --- |
| 1 | 110 | 5.7 | BEL* |
| 2 | 120 | 12.8 | 2.3 |
| 3 | 130 | 14.7 | 2.5 |
| 4 | 140 | 16.1 | 2.3 |
| 5 | 150 | 16.7 | 2.3 |
| 6 | 160 | 17.1 | 2.1 |
| 7 | 170 | 17.8 | 2.4 |
| 8 | 180 | 18.1 | 2.4 |

*BEL means burned entire length of sample.

The add-on increases with an increase in the curing temperature. All samples except sample No. 1 passed the vertical flame test. (Note that only 12.8% add-on gave a char length of 2.3 inches).

EXAMPLE 8

Curing Time Study

Example 7 was repeated except that the curing temperature was held constant at 160°C. and the curing time varied as shown in Table 4.

Table 4

| Fabric No. | Curing time, minutes | Fabric add-on % | Vertical Flame Test char length, inches |
| --- | --- | --- | --- |
| 1 | 1 | 15.4 | 2.0 |
| 2 | 2 | 16.0 | 2.1 |
| 3 | 3 | 16.5 | 2.4 |
| 4 | 4 | 17.2 | 2.1 |
| 5 | 5 | 17.8 | 2.1 |

The fabric add-on increased with curing time. All fabric samples passed the vertical flame test.

EXAMPLE 9

Drying Time Study

Example 8 was repeated except that curing time was held constant at 3 minutes and the drying time was varied from 0 to 4 minutes as shown in Table 5.

Table 5

| Fabric No. | Drying time minutes | Fabric add-on % | Vertical flame test, char length, inches |
| --- | --- | --- | --- |
| 1 | 0 | 16.1 | 2.3 |
| 2 | 1 | 16.4 | 2.3 |
| 3 | 2 | 17.5 | 2.4 |

Table 5-continued

| Fabric No. | Drying time minutes | Fabric add-on % | Vertical flame test, char length, inches |
|---|---|---|---|
| 4 | 3 | 17.1 | 2.0 |
| 5 | 4 | 18.0 | 2.6 |

The fabric add-on increased with an increase in drying time. All samples passed the Vertical Flame Test.

EXAMPLE 10

White cotton sateen fabric, 7.6 oz., bleached, kier-boiled, and scoured, was treated with solutions of THPOH and Gz. as described in the typical procedure above. The fabric was dried for 4 minutes at 85°C. and cured for 3 minutes at 160°C., and rinsed. The fabric data are shown in Table 6.

Table 6

| Fabric add-on, % | Before laundering | | | | | | |
|---|---|---|---|---|---|---|---|
| | char length inches | Flex abrasion, Fill,cycles | Breaking strength, Fill, lbs. | Tearing Strength Fill,gms | Conditioned Wrinkle Recovery, Warp & Fill, degrees | % N | % P |
| 16–16.5% | 2.6 | 2979 | 72.7 | 3167 | 276 | 3.71 | 1.93 |
| 13–13.5% | 2.3 | 3230 | 79.0 | 4100 | 271 | 3.05 | 1.62 |
| control | — | 1793 | 108.5 | 6367 | 192 | — | — |
| | After 50 launderings | | | | | | |
| 16–16.5% | 1.1 | 324 | 95.7 | 1917 | 214 | 3.47 | 2.45 |
| 13–13.5% | 1.0 | 324 | 103.7 | 2100 | 199 | 2.84 | 2.41 |
| control | — | 329 | 105.5 | 2200 | 183 | — | — |

The fabric had excellent flame retardance at add-ons as low as 13–13.5% as evidenced by a char length of only 2.3 inches. After 50 laundering cycles with a detergent followed by 50-tumble drying cycles, the char length of this same fabric was only 1.0 inch. The fabric with a 16–16.5% add-on had a char length of 1.1 inches after 50 laundering cycles, and of 1.3 inches after 65 laundering cycles (latter not shown in Table 6). The increase in phosphorus content after laundering was due to phosphorus pickup from the detergent.

White cotton sateen treated as above and having an add-on of 17–18% had a match test angle of 180° after heating for 1 hour at 70°–75°C. in a 2% solution of hydrochloric acid. A match test angle of 160° was obtained after boiling for 3 hours in a solution containing 0.5% soap and 0.2% sodium carbonate.

EXAMPLE 10

White cotton printcloth, 3.2 oz., bleached, kier-boiled, and scoured, was treated as in Example 9. The data are shown in Table 7.

Table 7

| Fabric add-on % | Before laundering | | | | | | |
|---|---|---|---|---|---|---|---|
| | Char length inches | Flex abrasion, Fill,cycles | Breaking strength, Fill,lbs. | Tearing strength Fill,gms | Conditioned Wrinkle recovery, Warp&Fill degrees | % N | % P |
| 20.5 | 3.6 | 579 | 32.4 | 420 | 263 | 4.63 | 2.40 |
| 16.5 | 3.8 | 889 | 31.7 | 473 | 252 | 3.90 | 1.88 |
| control | — | 455 | 41.8 | 507 | 142 | — | — |
| | After 50 launderings | | | | | | |
| 20.5 | 2.6 | 224 | 34.6 | 347 | 217 | 4.39 | 3.10 |
| 16.5 | 2.4 | — | — | — | 218 | 3.65 | 2.23 |
| control | | 253 | 40.3 | 487 | 180 | — | — |

There was evidence of crosslinking of the cellulose of the cotton fabric in Table 7 because the samples were insoluble in cupriethylenediamine hydroxide both before and after 50 laundering cycles.

Printcloth with an add-on of 16.5% had a 2.4 inch char length after 50 laundering cycles. The increase in phosphorus content after laundering was due to phosphorus pickup from the detergent.

EXAMPLE 11

A THPOH and guanazole solution was prepared by the standard procedure except that urea was added. The formula was as follows:

11.89 gms. 80% THPC (0.05 mole)
    3.72 gms. guanazole (0.0375 mole)
    1.24 gms. urea (0.021 mole)
    0.05 gms. Triton X-100
    1.76 gms. 45% Velvetol OE
    10.30 gms. 20% NaOH
    19.47 gms. water The percent reactive solids was 28% based on THPOH, guanazole and urea (mole ratio 1:0.75:0.42)

The solution was applied to 7.6 oz. cotton sateen dried for 3 minutes at 85°C. and cured for 3 minutes at 160°C. The fabric had an add-on of 18.5% and a char length of 2.6 inches after 50 laundering cycles.

EXAMPLE 12

A solution of THPOH and Gz. (28% solids) was prepared by the standard procedure. The solution was padded on to various cellulosic materials. The materials were dried for 5 minutes at 85°C. and cured for 5 minutes at 150°C., and rinsed. The data are shown in Table 8.

Table 8

| Fabric Type | Fabric add-on, % | Match test angle, degrees |
|---|---|---|
| paper | 27.6 | 180° |
| wool | 31.0 | 180° |
| rayon | 22.0 | 90° |
| jute | 32.4 | 135° |

EXAMPLE 13

THP- guanazole treatment

A solution was prepared as follows: 9.30 gms. (0.075) mole of crystalline tris(hydroxymethyl) phosphine (THP) of 95% purity was dissolved in 42.88 gms. of water. The pH was adjusted to about 9.0 with 20% sodium hydroxide. Then 0.06 gms. of Triton X–100 wetting agent and 7.40 gms. (0.075 mole) of Gz. were added and the pH finally adjusted to 8.5. The solution was padded on to cotton sateen, and the fabric was dried for 4 minutes at 85°C. and cured for 3 minutes at 160°C. and rinsed. The fabric had an add-on of 18.1% and had a match test angle of 180°, which indicates excellent flame retardancy.

EXAMPLE 14

THPC-Guanazole Treatment

A solution was prepared as follows: 11.87 gms. (0.05 mole) of 80% THPC (aqueous) and 4.96 gms. (0.05 mole) of guanazole were dissolved in 43.42 gms. of water. The solution had a pH of 3.8. Since this solution gels within 30 minutes at room temperature, it is necessary to apply it to cotton fabric immediately after mixing. The freshly prepared solution was padded on to two samples of cotton sateen (7.6 oz./sq.yd.). One sample was dried for 4 minutes at 85°C. and allowed to stand at room temperature (about 27°C.) for 18 hrs., rinsed in hot water and dried. The fabric had an add-on of 10.9%. The fabric strength was excellent and the match test angle for flame retardancy was 90°. The second fabric sample was not dried but was sealed while wet in a plastic bag, and allowed to stand 18 hrs. at room temperature, rinsed, and dried. The fabric had an add-on of 15.5%. The fabric strength was excellent, and the match test angle was 135°.

The excellent strength was attributed to the low reaction temperatures.

I claim:

1. A process for treating cellulosic material which comprises: phosphorous
   a. treating said cellulosic material with an aqueous solution containing (i) a phosphorus compound selected from the group consisting of tetrakis(hydroxymethyl)phosphonium chloride, tris(hydroxymethyl) phosphine oxide, and tris(hydroxymethyl)phosphine and (ii) an aminotriazole selected from the group having the structure

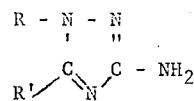

wherein R may be H, $NH_2$ or an alkyl or aryl radical, and R′ may be H or $NH_2$, the ratio of said phosphorous compound to aminotriazole being about from 1:0.25 to 1:1.5, and the pH of the solution being about from 2.8 to 9.5,
   b. curing the treated material at temperatures ranging about from room temperature to 180° C for periods of time about from 1 minute to 18 hours, the longer periods of time being required for the lower temperatures, and
   c. washing and drying the material.

2. The process of claim 1 wherein the triazole is guanazole of the structure

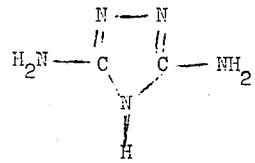

* * * * *